United States Patent
Vashaw et al.

(10) Patent No.: US 8,260,942 B2
(45) Date of Patent: Sep. 4, 2012

(54) CLUSTER VIEW PERFORMANCE

(75) Inventors: Barton C. Vashaw, Apex, NC (US);
Brian K. Martin, Cary, NC (US); Marc E. Haberkorn, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 12/632,427

(22) Filed: Dec. 7, 2009

(65) Prior Publication Data

US 2011/0138067 A1 Jun. 9, 2011

(51) Int. Cl.
*G06F 15/16* (2006.01)

(52) U.S. Cl. ......... 709/229; 709/224; 714/4.4; 370/218; 370/466

(58) Field of Classification Search ................ 709/229, 709/224; 714/4.4; 370/218, 466
See application file for complete search history.

(56) References Cited

U.S. PATENT DOCUMENTS

| | | | | |
|---|---|---|---|---|
| 6,163,855 | A * | 12/2000 | Shrivastava et al. | 714/4.4 |
| 6,697,326 | B1 * | 2/2004 | Britton et al. | 370/218 |
| 7,492,787 | B2 * | 2/2009 | Ji et al. | 370/466 |
| 2008/0295106 | A1 * | 11/2008 | Gissel et al. | 718/104 |
| 2009/0172151 | A1 * | 7/2009 | Davis | 709/224 |

* cited by examiner

*Primary Examiner* — Tammy Nguyen
(74) *Attorney, Agent, or Firm* — Jordan IP Law, PC

(57) ABSTRACT

A system and method of constructing cluster views may involve determining that a process such as an application server process having an IP address is stopped. Another IP address may be assigned to the process in response to determining that the process is stopped, wherein the other IP address is dedicated to processes that are stopped. If a connection request for the process is received at the other IP address, the connection request may be actively refused. The active refusal may significantly reduce the amount of time required to generate cluster views.

8 Claims, 2 Drawing Sheets

CLUSTER VIEW PERFORMANCE

BACKGROUND

1. Technical Field

Embodiments of the present invention generally relate to data processing systems. More particularly, embodiments of the invention relate to an improved approach to viewing the status of clustered application server processes.

2. Discussion

In data processing systems, SOA (Service Oriented Architecture) business applications and services may be logically organized into clusters. When a particular server process starts, it may attempt to build a view of which members in its cluster are running. The process may do so by iterating through a configured/known list of cluster members and attempting to establish a TCP (Transmission Control Protocol) connection with each of them. If a server member is available, it may be able to respond rather quickly. If it is not available, however, a TCP timeout must occur before the thread that attempted the connection may continue. Because the data processing system may use a limited number of threads to perform the view construction, and a TCP connection timeout could involve a wait that is on the order of minutes, the view construction might take a significant amount of time. Compounding this challenge may be the fact that autonomic controllers running in the process can experience timeouts in attempts to start processes while the view construction is taking place. When these attempts fail, processes can be flagged as being "sick", and left unused until manually reinstated as being operational.

BRIEF SUMMARY

Embodiments may provide for a computer-implemented method of managing application server processes in which it is determined that a first application server process having a first Internet Protocol (IP) address has stopped. The process might constitute an instance of all or part of the first application server. A second IP address can be assigned to the first application server process in response to determining that the first application server process is stopped, wherein the second IP address may be dedicated to application server processes that are stopped. In addition, the first and second IP addresses may reside in a common subnetwork. A MAC (Media Access Control) mapping update can also be transmitted based on the second IP address. If a TCP (Transmission Control Protocol) connection request is received for the first application server process at the second IP address, the connection request may be refused, particularly if it is determined that the first application server process is not listening on an availability detection port. In one example, the TCP connection request can be received from a second application server process, wherein the first and second application server processes are members of a cluster of application server processes. Thus, actively refusing the connection request can save a considerable amount of time in the generation of cluster views and can significantly enhance performance.

Embodiments can also provide for a computer-implemented method in which it is determined that a process having a first IP address is stopped, and a second IP address is assigned to the process in response to determining that the process is stopped, wherein the second IP address is dedicated to processes that are stopped.

Embodiments may also provide for a computer program product having a computer readable medium and computer usable code stored on the computer readable medium, where, if executed by a processor, the computer usable code can cause a computer to determine that a first application server process having a first IP address is stopped. The code can also cause a computer to assign a second IP address to the first application server process in response to determining that the first application server process is stopped, wherein the second IP address is to be dedicated to application server processes that are stopped. The first and second IP addresses may be in a common subnetwork. The code can also cause a computer to transmit a MAC mapping update based on the second IP address. If a TCP connection request is received for the first application server process at the second IP address, the connection request can be refused, particularly if it is determined that the first application server process is not listening on an availability detection port.

Embodiments may also provide for a computer program product having a computer readable medium and computer usable code stored on the computer readable medium, where, if executed by a processor, the computer usable code can cause a computer to determine that a process having a first IP address is stopped, and assign a second IP address to the process in response to determining that the process is stopped. The second IP address may be dedicated to processes that are stopped.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
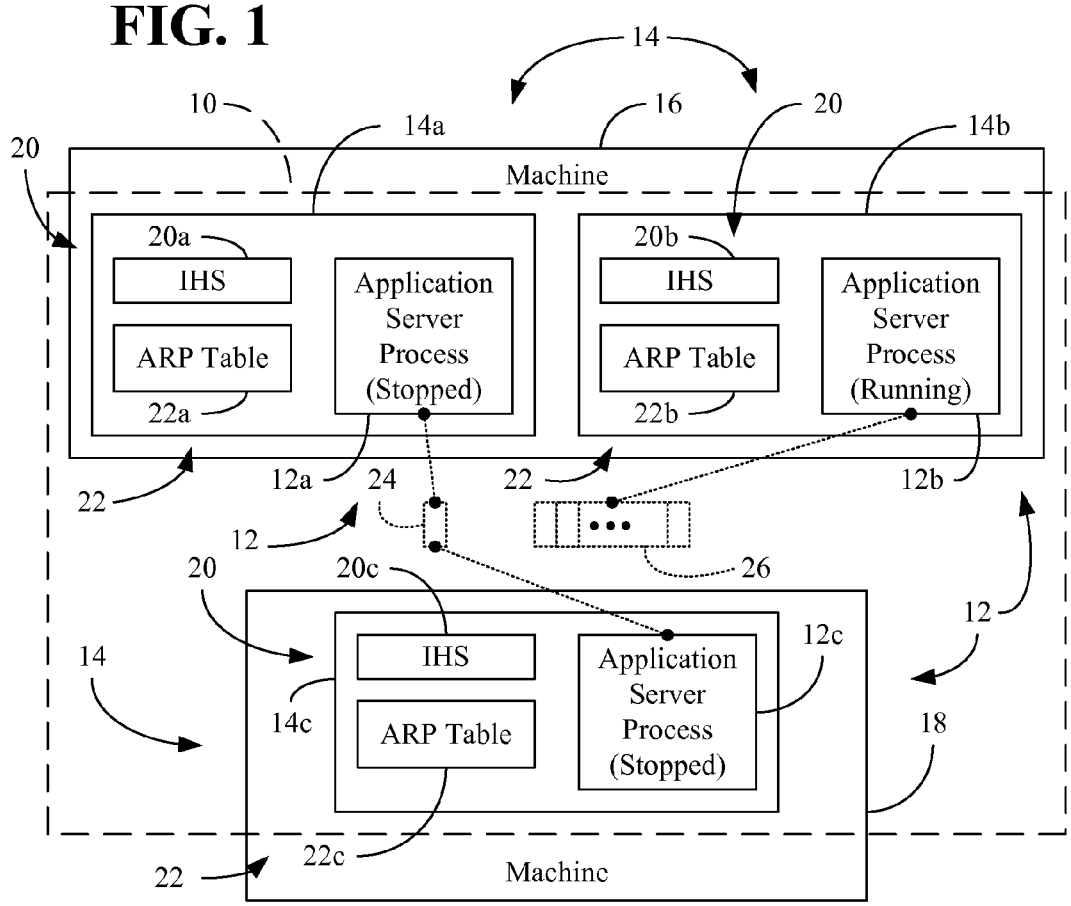
FIG. 1 is a block diagram of an example of a cluster of application server processes according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a cluster 10 of application server processes 12 (12a-12c) is shown. The application server processes 12 could provide a wide variety of services such as SOA (Service Oriented Architecture) business services that facilitate system integration, software deployment, e-commerce (electronic commerce), m-commerce (mobile commerce), and so on. Each application server process 12 could constitute an instance of all, or part of, a particular application server. In the illustrated example, each application server process 12 is associated with a corresponding node 14 (14a-14c), wherein the nodes 14 may be distributed across one or more machines 16, 18. Each node 14 may also include an IBM HTTP server (IHS) 20 (20a-20c) and an ARP (Address Resolution Protocol) table 22 (22a-22c), where the ARP tables 22 can enable conversion of Internet Protocol (IP) addresses into corresponding physical network addresses. In certain cases, it may be desirable to determine the status of the members of the cluster 10. In particular, when one of the application server processes 12 starts, it may attempt to build a view of which members in the cluster 10 are running. This activity may be referred to as the generation or construction of a cluster view. For example, the cluster view may be used to determine that the illustrated application server processes 12a and 12b are stopped, whereas the illustrated application server process 12b is running.

To enable faster and more efficient generation of cluster views, the stopped application server processes 12a and 12b may be assigned an IP address 24 that is dedicated to processes that are stopped. This dedicated IP address 24 may reside in the same subnetwork (subnet) as a remainder of IP addresses 26 that are not dedicated to stopped processes. Thus, the dedicated IP address 24 could be considered to be a "special entity" in the subnet. Generally, a process may associate with a particular machine's network interface controller (NIC, not shown) port (sometimes referred to as "binding") in order to send and receive data, meaning that the process will listen for incoming packets whose destination port number and destination IP address match that port, and/or send outgoing packets whose source port number is set to that port. In the illustrated example, the processes that are assigned to the dedicated IP address 24 do not listen on the port that is used for availability detection. Thus, when connection requests are received for the dedicated IP address 24, they can be actively refused. This active refusal can occur much faster than in conventional approaches that rely on timeouts. As a result, the generation of cluster views can be made to be much more efficient in the illustrated example. The illustrated running application server process 12b, on the other hand, is assigned one of the remainder IP addresses 26, listens on the availability detection port, and responds to connection requests in the normal fashion.

Figure 2:
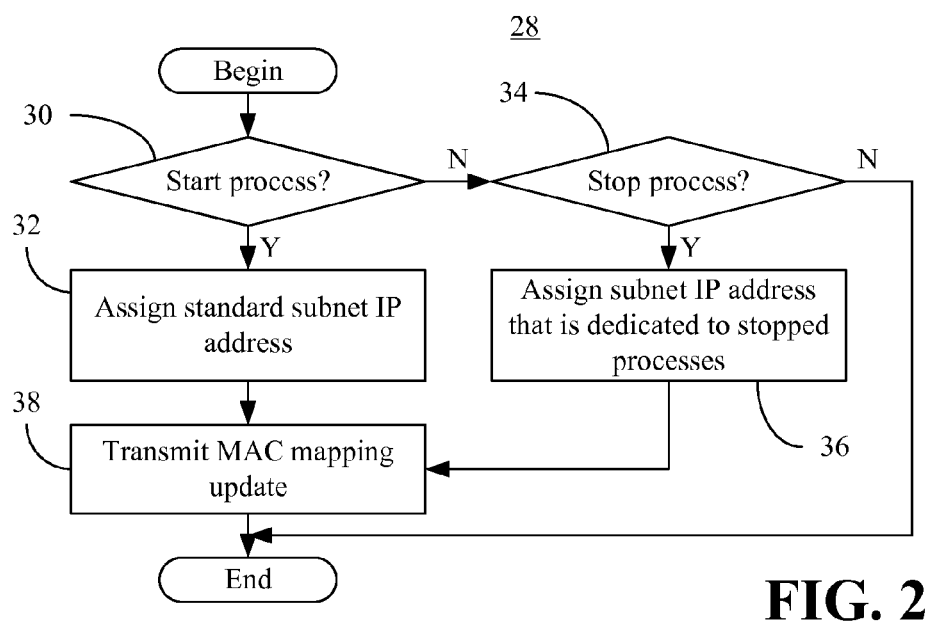
FIG. 2 is a flowchart of an example of a method of assigning IP addresses according to an embodiment.

FIG. 2 shows a method 28 of assigning IP addresses to a process. The method 28 may be implemented as a hook in a process such as one or more of the application server processes 12 (FIG. 1). In processing block 30, it is determined whether the process is started. If so, block 32 provides for assigning a standard IP subnet address from the remainder of IP addresses 26 (FIG. 1) to the process. Otherwise, block 34 determines whether the process is stopped. If so, a subnet IP address that is dedicated to stopped processes may be assigned to the process at block 36. Block 38 provides for transmitting a MAC (Media Access Control) mapping update based on the assigned address. In particular, transmitting the MAC address could include issuing a Gratuitous ARP request to update the ARP tables 22 (FIG. 1) of the other members of the cluster 10 (FIG. 1). The Gratuitous ARP request may include the IP address assigned to the process (e.g., "a.b.c.d" in dot-decimal notation) and the MAC address of the NIC of the machine on which the process runs.

Figure 3:
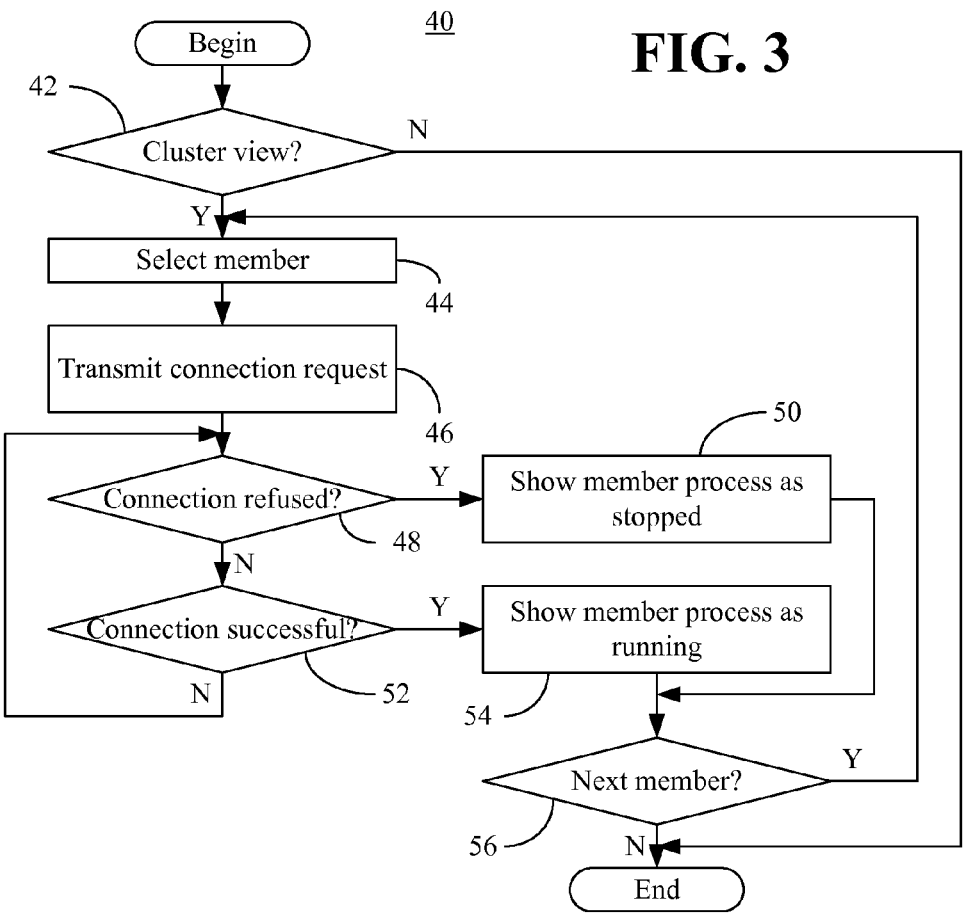
FIG. 3 is a flowchart of an example of a method of constructing a cluster view according to an embodiment.

Turning now to FIG. 3, a method 40 of constructing a cluster view is shown. The illustrated method 40 may be implemented as one or more threads in a process such as one or more of the application server processes 12 (FIG. 1). Processing block 42 may provide for determining whether construction of a cluster view has been initiated. If so, a cluster member is selected at illustrated block 44, and block 46 can provide for transmitting a connection request for the IP address of the selected member. As already noted, the node associated with the transmitting process may have previously received one or more Gratuitous ARP requests from other members in the cluster, and updated its ARP table with the appropriate dedicated or non-dedicated IP addresses accordingly. In one example, the connection request may be a TCP (Transmission Control Protocol) connection request. If it is determined at illustrated block 48 that the connection has been refused (e.g., via receipt of an active connection denial message), block 50 may provide for updating the cluster view to show that the member process in question is stopped. If, on the other hand, it is determined at block 52 that the connection has been successful, block 54 can provide for updating the cluster view to show that the member process is running. Illustrated block 56 provides for determining whether there are additional members in the cluster and repeating of the method 40 as appropriate.

Figure 4:
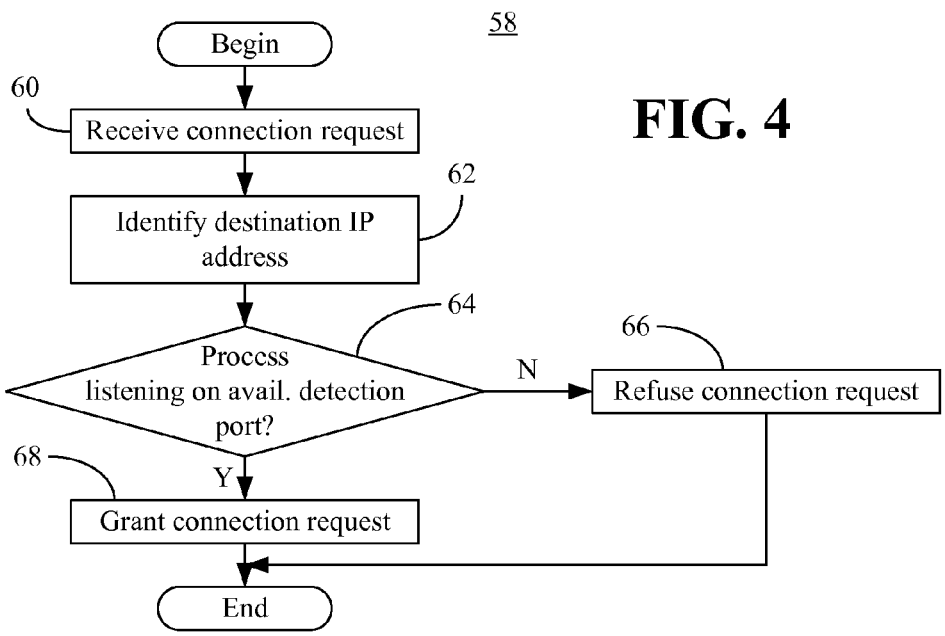
FIG. 4 is a flowchart of an example of a method of responding to a connection request according to an embodiment.

FIG. 4 shows a method 58 of responding to a connection request. The method 58 may be implemented in a node 14 (FIG. 1) having one or more application server processes 12 (FIG. 1). Illustrated processing block 60 provides for receiving a connection request for a process at an IP address. As already noted, the process could be a member of a cluster of application server processes and the connection request might be a TCP connection request from another member of the cluster. A destination IP address may be identified at block 62 based on the connection request. If it is determined at block 64 that the process corresponding to the destination IP address is not listening on the availability detection port of the NIC of the machine on which the process runs, the connection request may be refused at block 66 by transmitting a connection denial message. If the process is listening on the availability detection port, illustrated block 68 provides for granting the connection request.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer-implemented method comprising: determining that a first application server process having a first Internet Protocol (IP) address is stopped; assigning a second IP address to the first application server process in response to determining that the first application server process is stopped, wherein the second IP address is dedicated to application server processes that are stopped, and the first and second IP addresses are in a common subnetwork; transmitting a Media Access Control (MAC) mapping update based on the second IP address; receiving a Transmission Control Protocol (TCP) connection request for the first application server process at the second IP address; and refusing the TCP connection request, wherein the TCP connection request is received from a second application server process and the first and second application server processes are members of a cluster of application server processes.

2. The computer-implemented method of claim 1, wherein refusing the TCP connection request includes: determining that the first application server process is not listening on an availability detection port; and transmitting a connection denial message to the second application server process.

3. The computer-implemented method of claim 1, wherein transmitting the MAC mapping update includes issuing a Gratuitous Address Resolution Protocol (ARP) request.

4. The computer-implemented method of claim 1, further including: determining that the first application server process is running; and assigning a third IP address to the application server process in response to determining that the first application server process is running, wherein the first and third IP addresses are not dedicated to application server processes that are stopped.

5. A computer program product comprising: a non-transitory computer readable medium; and computer usable code stored on the computer readable medium, where, if executed by a processor, the computer usable code causes a computer to: determine that a first application server process having a first Internet Protocol (IP) address is stopped; assign a second IP address to the first application server process in response to determining that the first application server process is stopped, wherein the second IP address is to be dedicated to application server processes that are stopped, and the first and second IP addresses are in a common subnetwork; transmit a Media Access Control (MAC) mapping update based on the second IP address; receive a Transmission Control Protocol (TCP) connection request for the first application server process at the second IP address; and refuse the TCP connection request, wherein the TCP connection request is to be received from a second application server process and the first and second application server processes are to be members of a cluster of application server processes.

6. The computer program product of claim 5, wherein refusing the TCP connection request is to include: determining that the first application server process is not listening on an availability detection port; and transmitting a connection denial message to the second application server process.

7. The program product of claim 5, wherein transmitting the MAC mapping update is to include issuing a Gratuitous Address Resolution Protocol (ARP) request.

8. The computer-implemented method of claim 5, further including: determining that the first application server process is running; and assigning a third IP address to the application server process in response to determining that the first application server process is running, wherein the first and third IP address are not dedicated to application server processes that are stopped.

* * * * *